Sept. 15, 1925. 1,553,782
A. F. LAURENCE
COMBINATION PROVISION BOX AND TABLE
Filed June 14, 1923
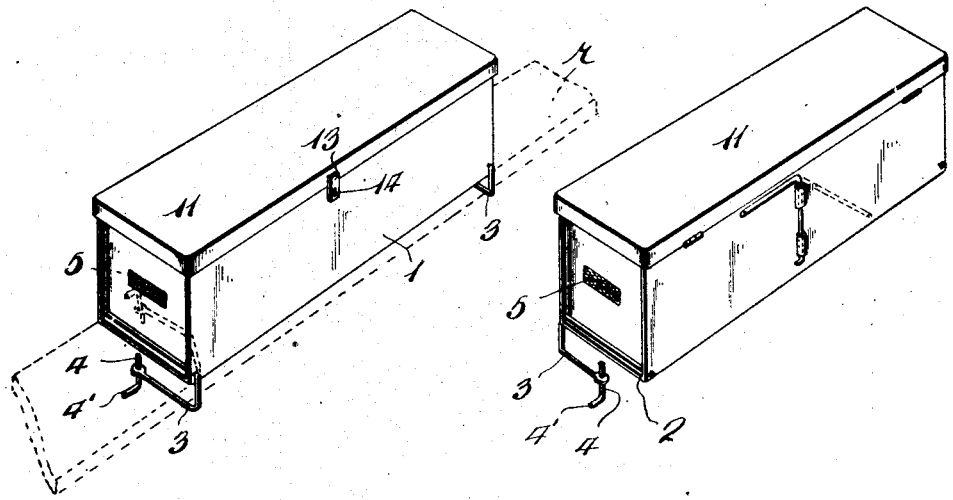
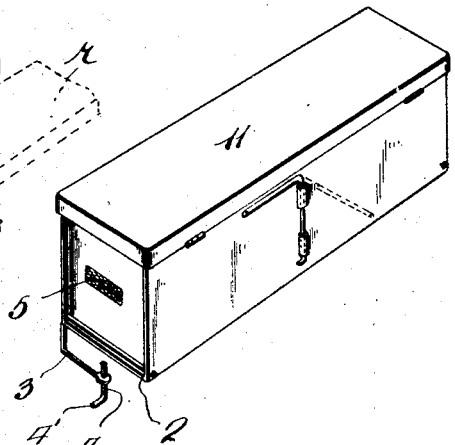
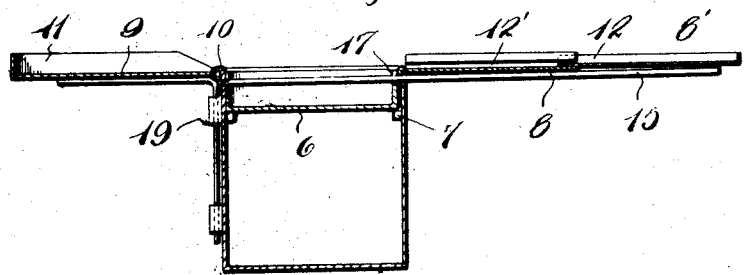
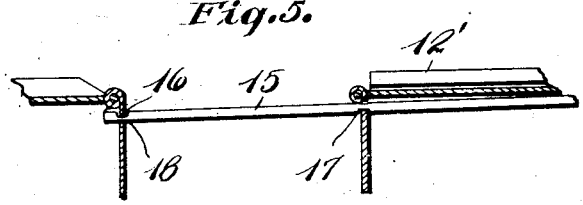
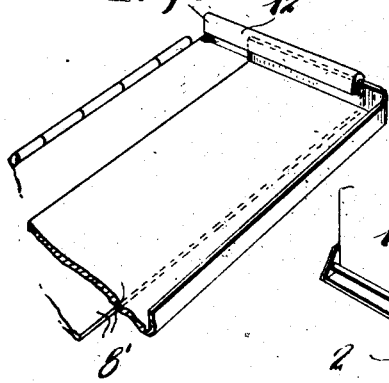
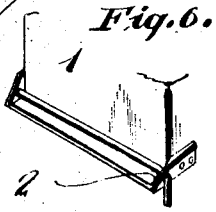
Inventor
Albert F. Laurence
By William C. Linton
Attorney Patented Sept. 15, 1925.

1,553,782

UNITED STATES PATENT OFFICE.

ALBERT FRANKLIN LAURENCE, OF MUSKOGEE, OKLAHOMA.

COMBINATION PROVISION BOX AND TABLE.

Application filed June 14, 1923. Serial No. 645,419.

*To all whom it may concern:*

Be it known that I, ALBERT FRANKLIN LAURENCE, a citizen of the United States of America, residing at Muskogee, in the county of Muskogee and State of Oklahoma, have invented certain new and useful Improvements in Combination Provision Boxes and Tables; and I do hereby declare that the following is a full, clear, concise, and exact description of the invention, such as will enable others skilled in the art to which it appertains to make and use the same.

This invention relates to improvements in special receptacles, having for an object to provide a combination provision box and table especially advantageous for use by automobile tourists, campers, and like parties, the construction of the device being such as will permit the same to be conveniently arranged upon and secured to the running board of a vehicle and to receive therein provisions for consumption by the users.

It is likewise an object of the invention to provide a device of the character mentioned wherein a pair of closures are provided, one thereof being of a size as will permit of its snug arrangement in the open upper portion of the box when not in use and being provided with means to allow extension thereof when in open position in order that it may effectually serves as a table, while the remaining cover is adapted to be engaged over the inner cover, when closed, and to afford a weather-tight closure for the box, but when in open position, to constitute an extension of the table, above referred to.

Among other aims and objects of the invention may be recited the provision of the device with novel forms of clamps in order that it may be secured to the running board of an automobile during portage, but with removal from such running board, may be swung outwardly and utilized as handles to facilitate carrying of the box.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:—

Figure 1 is a perspective view of the improved device showing it arranged in position upon the running board of an automobile, the latter element being shown in dotted lines;

Figure 2 is a similar view showing the opposite side of the box and the L-shaped bracket arm which is utilized, at times, to support the outer closure in its open horizontal position;

Figure 3 is a vertical transverse section through the box showing the inner and outer covers thereof in their open positions and serving as tables;

Figure 4 is a fragmentary detail in perspective, showing the construction of the inner cover whereby the several sections thereof may be moved to extended positions for increasing the size or area of the same;

Figure 5 is an enlarged fragmentary detail, partly in section, showing the manner in which the inner cover is braced in its horizontal open position whereby to provide a stable form of table; and, Figure 6 is a fragmentary detail in perspective, showing the manner in which the clamps are pivotally mounted upon the lower portions of the opposite ends of the box.

Having more particular reference to the drawings, in connection with which like characters of reference will designate corresponding parts throughout, the improved device may be stated to comprise a substantially rectangular receptacle generally indicated by the numeral 1, being formed of sheet metal, wood, or other suitable material, such as conditions or preference may dictate, and having the opposite ends thereof slightly extended as indicated at 2 whereby to permit the pivotal mounting of the substantially U-shaped clamps 3 upon the lower portions of such opposite ends; it being noted in this connection, that the inner lateral portions or leg extremities of the U-shaped clamps 3 are of lengths greater than the opposite extremities and in consequence, extend transversely across the entire width of the box, as indicated in the Figures 1 and 2, the outer and shorter lateral extremity or leg being provided with an enlarged free end having a screw threaded opening therein adapted to receive a clamping screw 4 therein, which screw, as will be noted, is provided with a suitable form of handle 4'. By means of the construction and arrangement of the clamps 3 upon the lower portions of the opposite ends of the receptacle 1, it will be understood that with the swinging of the same to their downward or lower positions as indicated in the Figure 1, they may be engaged over the outer portion of the running board r of an automobile to be equipped with the invention, whereupon the clamping screws 4 are turned in a direction to cause the inner ends of the same to clampingly engage with adjacent portions of such running board r. Thus, the invention will be firmly secured in position upon the running board during travel of the equipped automobile. When, however, the receptacle is to be removed from the running board r, the clamping screws 4 are loosened and the receptacle is slid laterally and outwardly to effect disengagement of the shorter leg portions of the clamps 3 from the running board r, whereupon such clamps may be swung outwardly and upwardly to positions as indicated in dotted lines in Figure 1 and advantageously used as handles for carrying the box.

Vent openings preferably covered by a fine wire mesh 5 may be and preferably are formed in the opposite end walls of the receptacle 1, for an obvious purpose.

The open upper portion of the rectangular receptacle or box 1 is adapted to receive therein a correspondingly shaped tray 6, such tray being supported upon internally arranged shoulders formed upon or secured to the inner side of the side and end walls of the receptacle, thus providing means for permitting the matter stored or placed in the box to be separated as may be required.

Inner and outer covers 8 and 9 are provided the receptacle and as will be noted, are hinged adjacent their inner marginal portions to the upper ends of the opposite side walls of such receptacle, as indicated by the numeral 10, the outer marginal portions of such closures being flanged as indicated at 11 and 12, the purpose of which will be subsequently apparent.

The inner closure 8 comprises sections 8' adapted to be telescopically engaged, as shown in the figure 4, guide ways 12' being formed upon the opposite end portions of one of said sections 8' and slidably receive therein the correspondingly flanged portions of the opposite section. With the sections 8' of the inner cover 8 in their telescoped position, the size of such cover will permit of its snug engagement in the open upper portion of the receptacle 1, whereat the same will be arranged in nested relation with respect to the tray 6 supported therein.

The cover 9 is of a size such as will permit engagement of its flanged outer marginal portions 11 over the upper portions of the receptacle walls and in consequence, will provide an effectual and weather-tight closure therefor.

If desired, the outer cover 9 may be provided with a suitable form of hasp or similar device 13 adapted to be engaged over a staple or keeper 14 arranged upon an adjacent portion of the outer side wall of the receptacle 1. Thus, the cover 9 may be secured in its closed position.

With swinging of the covers 8 and 9 to their open positions, the same are arranged in substantially horizontal planes, as shown in the Figure 3 and to support the sectional cover 8 in its particular horizontal position, a supporting and bracing bar 15 is employed, notches 16 and 17 being formed in said bar and adapted to be engaged with the opposite sides of openings 18 formed in the upper portions of the opposite side walls of the receptacle 1 and adapted to receive said bar therethrough. Thus, the extended outer portion of the supporting and bracing bar 15 will be arranged directly beneath and transversely of the sectional cover 8 and in consequence, such cover in resting thereupon will be provided a stable support and brace. Hence, the rigidity and stability of the table constituted by said cover 8 will be increased. Furthermore, if desired, the movable section 8' of the sectional cover 8 may be slid to its extended position, as indicated in the Figure 3, thus increasing the area or size of the table so constituted; the length of the outer portion of the bracing and supporting bar 15 being such as to approximate the increased area of the sectional cover. With arrangement of the cover 9 in its open horizontal position, an L-shaped bracket pivotally mounted in brackets 19 upon the adjacent side wall of the receptacle 1 is swung to its outermost position, whereat the horizontal extremity of said bracket will be arranged directly under and transversely of the cover 9 and in consequence, will provide a support thereto and hence, increase the stability of the same. Should it be desired to increase the area of the table as afforded by the opened covers 8 and 9, the tray 6 may be removed from the open upper end of the receptacle 1 and inverted, so that the marginal portions thereof will rest upon the internal shoulders 7, whereas the bottom of said tray will be in a position substantially flush with the upper marginal portions of the receptacle walls.

Manifestly, the construction shown is capable of considerable modification and such modification as is within the scope of my claims, I consider within the spirit of my invention.

I claim:

1. A device of the character described comprising a receptacle, opposed vertically swingable covers hinged to the upper portion of said receptacle engageable one over the other in their closed positions, one of said covers being extensible, means removably engaged with the upper portion of said receptacle adjacent the extensible cover adapted, at times, to support the same in a horizontal and open position, a substantially L-shaped bracket arm pivotally secured to the intermediate portion of that side wall of said receptacle receiving the remaining cover adapted to have the free portion thereof swung beneath the remaining cover whereby to support the same in a horizontal position, and substantially U-shaped clamping members pivotally secured to the lower portions of the opposite ends of the receptacle, adapted, at times, to facilitate the securing of such receptacle to the running board of a vehicle, and at other times, to be swung upwardly and outwardly, whereby to afford handles for the receptacle.

2. A device of the character described comprising a receptacle, a pair of opposed covers hinged to the upper portions of the opposite sides thereof, one being snugly receivable in the open upper portion of the receptacle and the other engageable over said open portion, the first mentioned cover being formed of slidably interengaged sections, means for bracing said covers in substantially horizontal planes with movement of the same to open positions, and substantially U-shaped clamping members pivotally engaged in the lower portions of the opposite ends of said receptacle adapted, at times, to facilitate the securing of the receptacle to an object and at other times to be swung outwardly and upwardly to afford handles for the receptacle.

3. A device of the character described comprising a receptacle, a tray snugly received in and supported in the upper portion of said receptacle, opposed covers hinged to the upper portions of the opposite sides thereof, one being snugly received in the open upper portion of said receptacle in substantially nested relation to said tray and the other engageable over said open portion, the first mentioned cover being composed of slidably interengaged sections, the upper portions of the opposite sides of said receptacle having transversely aligned openings formed in their intermediate portions, a bracing bar having notches formed in portions thereof receivable through said transversely aligned openings and adapted to have one portion thereof arranged beneath the sectional cover whereby to brace the same in a substantially horizontal plane, when opened, a substantially L-shaped bracket arm pivotally secured to the intermediate portion of the opposite side wall of said receptacle and adapted to have the free portions thereof swung beneath the remaining cover whereby to support the same in a substantially horizontal plane, when opened, and substantially U-shaped clamping members pivotally secured in the lower portions of the opposite ends of said receptacle adapted, at times, to facilitate the securing of the receptacle to the running board of a vehicle and at other times to be swung upwardly and outwardly whereby to afford handles for the receptacle.

In witness whereof I have hereunto set my hand.

ALBERT FRANKLIN LAURENCE.